M. DEILLER.
DEVICE FOR REMOVING GUM FROM CUTTERS OF TOBACCO STRIPPING MACHINES.
APPLICATION FILED MAR. 28, 1912.

1,046,994.

Patented Dec. 10, 1912.

Witnesses:

Inventor
Martin Deiller
By his Attorney

UNITED STATES PATENT OFFICE.

MARTIN DEILLER, OF NEWARK, NEW JERSEY, ASSIGNOR TO UNIVERSAL TOBACCO MACHINE COMPANY, A CORPORATION OF NEW YORK.

DEVICE FOR REMOVING GUM FROM CUTTERS OF TOBACCO-STRIPPING MACHINES.

1,046,994. Specification of Letters Patent. Patented Dec. 10, 1912.

Application filed March 28, 1912. Serial No. 686,719.

*To all whom it may concern:*

Be it known that I, MARTIN DEILLER, a citizen of the United States, residing at Newark, in the county of Essex and State of New Jersey, have invented a certain new and useful Improvement in Devices for Removing Gum from Cutters of Tobacco-Stripping Machines, of which the following is a specification.

In U. S. Letters Patent No. 985,984, granted to myself and Eugene M. Deiller, March 7, 1911, we have disclosed a tobacco stripping and booking machine embodying a rotary cutter for cutting out the stems of the tobacco leaves, which comprises a toothed disk, the forward or cutting faces of the teeth of which are curved eccentric to the axis of rotation. Upon the sides of said disk are secured thin steel blades of the same shape, and for a considerable distance back from the point of each tooth said disk is grooved to fit against the stem of the tobacco leaf. When in operation, this cutter projects between sharpened projecting flanges on the drum sections upon which the leaves are received and booked. The leaf is fed so that the stem comes between the grooved edge of the cutter and the space between said flanges, so that the cutter thus severs the leaf along each side of the stem, and forces the stripped stem down between the drum sections, whence it may fall from the machine. I have found in the practical operation of this cutter that after a certain amount of usage the blades fail to make a clean cut. I have discovered that this is due to gum pressed from the leaves by the action of the cutter teeth, which gum becomes packed hard in and finally fills the cutter groove.

My present invention provides for the removal of this gum as fast as it forms, and so maintains the cutting efficiency of the blades.

Figure 1:
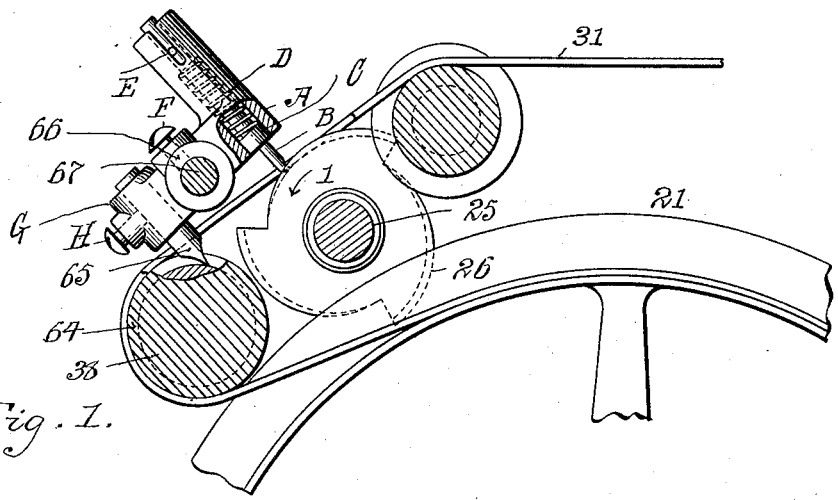
Figures 2, 3:
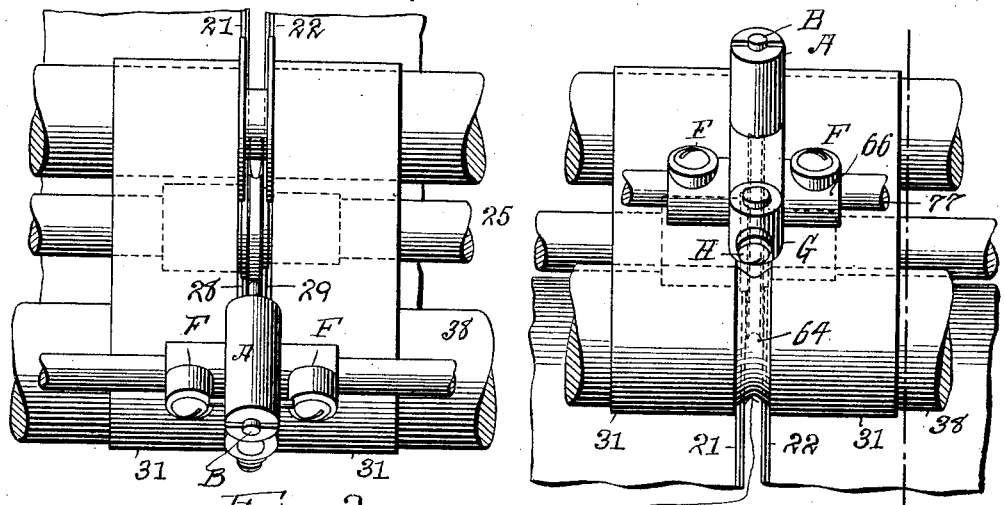
Figures 4, 5:
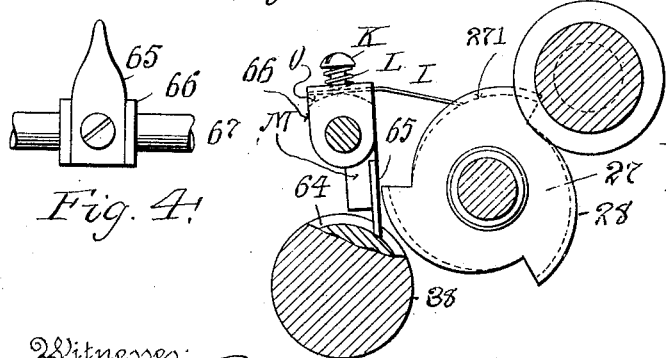
Figure 6:
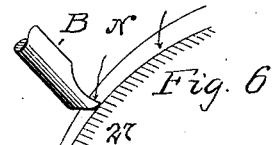

In the accompanying drawings—Figure 1 is a sectional view of a preferred form of my device on the line $x, x$ of Fig. 2, Fig. 2 is a top, and Fig. 3 a side elevation of the same. Fig. 4 shows separately the fixed finger for clearing the guide groove on the roller over which the stem passes to the cutter, which finger, as hereinafter explained, may be mounted on the support for my gum removing device, Fig. 5 is a sectional view of a modified form of my said device, and Fig. 6 shows the plow point of the gum removing arm.

Similar numbers of reference indicate like parts, and parts in my present drawing which are identical with parts shown in the drawings of aforesaid Patent No. 985,984 are similarly numbered.

Fast upon the rotary shaft 25 is the cutter 26 which works between the annular flanges 21, 22 of the drum. Said cutter comprises the toothed disk 27, to the sides of which are secured thin steel blades 28, 29 of the same shape as the cutter disk. For a considerable distance back from the point of each tooth the disk 27 is grooved, as at 271, dotted lines, to fit against the stem of the tobacco leaf. As the cutter rotates, the blades shear against the sharpened projecting flanges 21, 22, and so sever the leaf fed thereto on each side of the stem.

At 31 are shown the belts which engage the leaves, in the manner fully explained in the aforesaid patent.

38 is the belt roller, having at its middle portion the groove 64, which groove receives the stem to bring it into alinement with the rotary cutter directly behind and to guide it to said cutter.

65 is a scraping finger which projects into said groove and is carried by a collar 66 fast on a fixed shaft 67.

All of the aforesaid parts are shown and described in said Patent No. 985,984.

In the preferable arrangement of my present device shown in Figs. 1, 2 and 3, I form, preferably integrally with the collar 66, a sleeve A, in the bore of which is disposed a rod B, having a fixed collar or enlargement C, between which and a shoulder in said bore is interposed a helical spring D. The upper portion of the sleeve is longitudinally slotted to receive guide pins E projecting from rod B. The spring D holds the lower extremity of rod B in the groove of the cutter disk 27, so that the end of the rod makes contact with the said disk. On said extremity is formed a plow point, as shown at N, Fig. 6. When the cutter rotates in the direction of the arrow 1, said point removes the gum as fast as it is formed, the spring D permitting the rod to move longitudinally in the sleeve A and so maintain constant contact with the disk. The collar 66 may be rotated on shaft 67 to vary the inclination of rod B, and may be clamped in adjusted position by the set screw F.

In addition to the sleeve A on the collar 66, I may provide a second sleeve G to receive the shank of the finger 65, which is made adjustable therein and clamped by the set screws H. By this arrangement the collar 66 may first be turned on fixed shaft 67 to give to sleeve A the proper inclination and clamped by the set screws F. The finger 65 may then be adjusted in its sleeve with reference to the groove in roller 38 and secured by screws H.

Instead of the form of my device shown in Figs. 1, 2 and 3, I may employ the form shown in Fig. 5. The collar 66 here is made with a recess to receive the leaf spring I, through which spring loosely passes the screw K which enters said collar. Above spring I and between said spring and the screw head is a helical spring L. The extremity of spring I enters the groove in the cutter and operates to remove the gum therefrom as fast as the same is deposited. Owing to the rapid rotation and eccentric shape of said cutter, the spring I is subject to very frequent shocks which in time, if the spring is rigidly clamped in place, are apt to crystallize the metal of the spring and so determine its breakage. The second or helical spring L takes up these vibrations, and so prevents this difficulty. In this arrangement, the finger 65 may be a steel blade, secured in any suitable way to a downward projection M on the collar. The elasticity of spring I permits of suitable adjustment of finger 65 to groove 64, while at the same time maintaining its own contact with the cutter. The bottom of the recess in collar 66 is made convex, as shown at O, Fig. 5, so that the spring I may freely rock thereon.

I claim:

1. In combination with the rotary eccentrically toothed cutter of a tobacco stripping machine, said cutter having a groove in its edge, and means for continuously removing from said groove gum deposited in said groove from said leaves during the operation of said cutter.

2. In combination with the rotary eccentrically toothed cutter of a tobacco stripping machine, said cutter having a groove in its edge, a resilient arm entering said groove and bearing at its end on said cutter, and means for supporting said arm.

3. In combination with the rotary eccentrically toothed cutter of a tobacco stripping machine, said cutter having a groove in its edge, an arm entering said groove, a spring bearing on said arm to hold the same against said cutter, and means for supporting said arm.

4. In combination with the rotary eccentrically toothed cutter of a tobacco stripping machine, said cutter having a groove in its edge, a sleeve, a support therefor, a rod longitudinally movable in said sleeve and entering said groove, and a spring in said sleeve and bearing on said rod to hold the same against said cutter.

5. In combination with the rotary eccentrically toothed cutter of a tobacco stripping machine, said cutter having a groove in its edge, a transverse fixed shaft, a collar rotatable thereon, means for clamping said collar in position, a sleeve on said collar, a rod longitudinally movable in said sleeve and entering said cutter groove, and a spring in said sleeve and bearing on said rod to hold the same against said cutter.

6. In combination with the rotary eccentrically bladed cutter and feed roll of a tobacco stripping machine, the said cutter having a groove in its edge and the said feed roll having a circumferential groove disposed in front of said cutter groove, a transverse fixed shaft, a collar rotatable thereon, means for clamping said collar in position on said shaft, a finger secured to said collar and entering said roll groove, and a resilient arm on said collar entering said cutter groove and bearing at its end on said cutter.

7. In combination with the rotary eccentrically bladed cutter and feed roll of a tobacco stripping machine, the said cutter having a groove in its edge and the said feed roll having a circumferential groove disposed in front of said cutter groove, a transverse fixed shaft, a collar rotatable thereon, means for clamping said collar in position on said shaft, two sleeves on opposite sides of said collar, a finger longitudinally adjustable in one of said sleeves and entering said roll groove, a rod longitudinally movable in the other sleeve, and a spring in said last-named sleeve and bearing on said rod to hold the same against said cutter.

In testimony whereof I have affixed my signature in presence of two witnesses.

MARTIN DEILLER.

Witnesses:
 CHAS. P. DAY,
 EUGENE M. DEILLER.